United States Patent
Sugiyama et al.

(10) Patent No.: US 7,687,765 B2
(45) Date of Patent: Mar. 30, 2010

(54) ENCODER INCLUDING A TWO DIMENSIONAL PHOTO-DETECTOR HAVING TWO SIGNAL PROCESSING SECTIONS FOR PIXELS IN A FIRST AND A SECOND DIRECTION

(75) Inventors: Yukinobu Sugiyama, Hamamatsu (JP); Seiichiro Mizuno, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 11/632,205

(22) PCT Filed: Jul. 8, 2005

(86) PCT No.: PCT/JP2005/012674
§ 371 (c)(1),
(2), (4) Date: Jan. 2, 2008

(87) PCT Pub. No.: WO2006/006532
PCT Pub. Date: Jan. 19, 2006

(65) Prior Publication Data
US 2008/0106739 A1    May 8, 2008

(30) Foreign Application Priority Data
Jul. 12, 2004    (JP) .............................. 2004-205198

(51) Int. Cl.
*G01D 5/34* (2006.01)
*H01L 27/00* (2006.01)
(52) U.S. Cl. ................. 250/231.13; 250/208.1
(58) Field of Classification Search ............ 250/231.13, 250/231.14, 231.18, 208.1, 208.2, 237 G; 341/13, 14; 356/138, 139
See application file for complete search history.

(56) References Cited
U.S. PATENT DOCUMENTS
4,779,211 A * 10/1988 March ........................ 702/150

(Continued)

FOREIGN PATENT DOCUMENTS
JP            58-69216            5/1983

(Continued)

*Primary Examiner*—Que T Le
*Assistant Examiner*—Jennifer Bennett
(74) *Attorney, Agent, or Firm*—Drinker Biddle & Reath LLP

(57) ABSTRACT

The present invention relates to an encoder capable of detecting an absolute value of an angle of rotation or the like of a target to be measured by a simple configuration with high accuracy. In the encoder, a photodetecting region of a photodetecting device and regions to be detected arranged on a scale plate satisfy a relational expression of $W/2<D<W$ provided that a width of a photodetecting region is defined as W and arrangement pitches of the regions to be detected alternately arranged on two lines are defined as D. In this relationship, at least one of two regions to be detected adjacent to each other is always at a position overlapping the photodetecting region. The regions to be detected are different from each other in alignment of light and dark patterns along a second direction perpendicular to a first direction in which the two lines extend, so that the region to be detected that overlaps the photodetecting region can be identified based on light intensity profile data along the second direction. Furthermore, a position in the first direction of the identified region to be detected, based on light intensity profile data along the first direction, can be identified.

5 Claims, 10 Drawing Sheets

U.S. PATENT DOCUMENTS

| | | | |
|---|---|---|---|
| 5,068,529 A * | 11/1991 | Ohno et al. | 250/231.18 |
| 5,288,993 A * | 2/1994 | Bidiville et al. | 250/221 |
| 5,396,063 A * | 3/1995 | Ito et al. | 250/231.18 |
| 5,917,182 A | 6/1999 | Ishizuka | |
| 5,965,879 A * | 10/1999 | Leviton | 250/231.13 |
| 6,765,195 B1 * | 7/2004 | Leviton | 250/231.13 |
| 7,060,968 B1 * | 6/2006 | Leviton | 250/231.13 |

FOREIGN PATENT DOCUMENTS

| | | |
|---|---|---|
| JP | 62-6118 | 1/1987 |
| JP | 62-135723 | 6/1987 |
| JP | 63-136722 | 6/1988 |
| JP | 3-59417 | 3/1991 |
| JP | 8-10145 | 1/1996 |
| JP | 9-145408 | 6/1997 |
| WO | 03/049190 | 6/2003 |

* cited by examiner

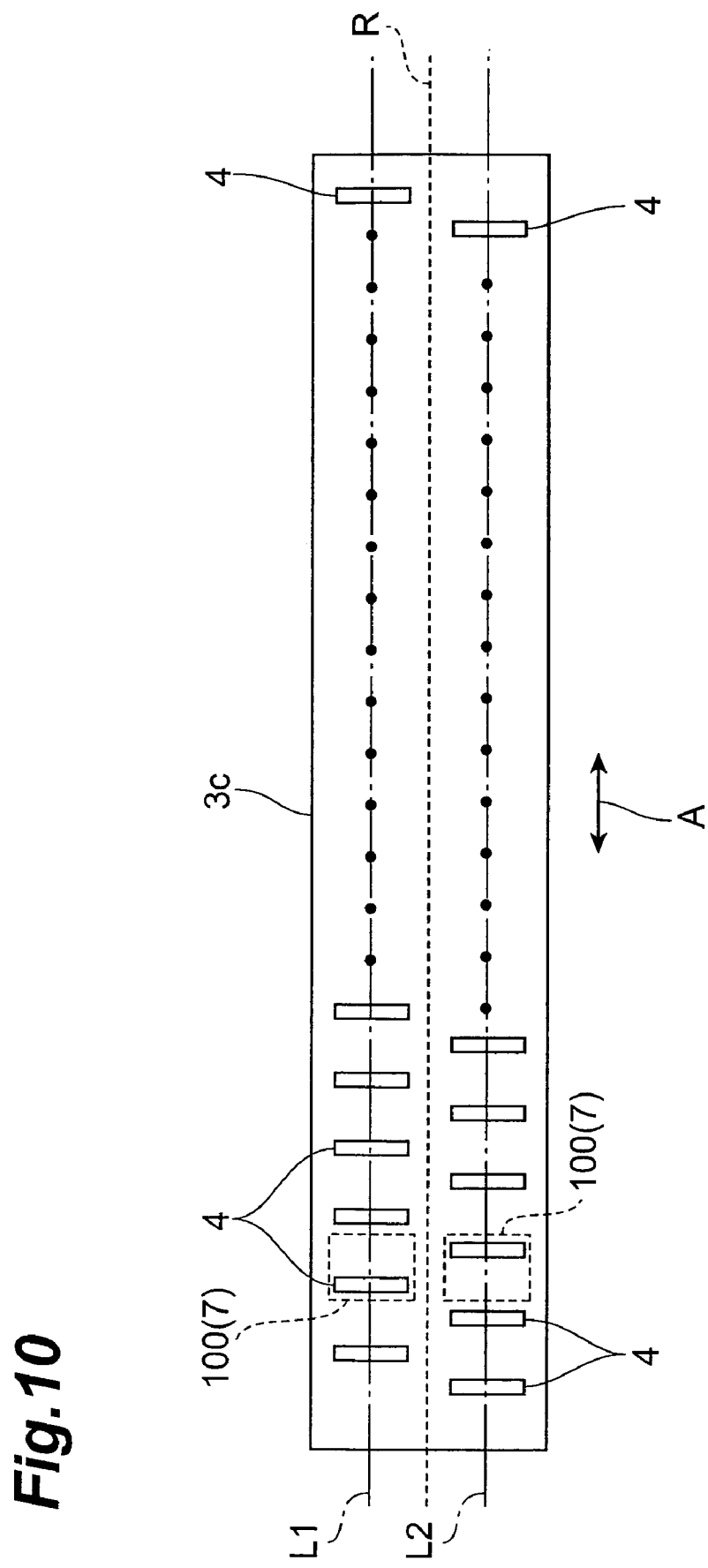

ENCODER INCLUDING A TWO DIMENSIONAL PHOTO-DETECTOR HAVING TWO SIGNAL PROCESSING SECTIONS FOR PIXELS IN A FIRST AND A SECOND DIRECTION

TECHNICAL FIELD

The present invention relates to an encoder applicable to measurement of a position of a target to be measured, more specifically, to an optical encoder.

BACKGROUND ART

As a conventional encoder, for example, there is known an optical encoder described in Patent document 1. Namely, this optical encoder comprises an optical scale on which a plurality of latticed windows, constituted by different types of diffraction gratings, are arranged at predetermined intervals, and a two-dimensional image sensor. When this optical scale is irradiated with light, the two-dimensional image sensor picks up a pattern of light diffracted by the latticed window. Then, the optical encoder identifies the latticed window based on the picked-up diffracted light pattern and identifies a position of the latticed window in the moving direction of the optical scale based on the position of the diffracted light pattern in the image to detect an absolute position of a target to be measured.

Patent document 1: Japanese Examined Patent Publication No. H08-10145

DISCLOSURE OF THE INVENTION

Problem to be Solved by the Invention

The inventors have studied conventional encoders in detail, and as a result, have found problems as follows. That is, in the optical encoder described in the Patent document 1, resolution of detection of an absolute position of a target to be measured is high, however, due to application of the two-dimensional image sensor, a frame memory becomes necessary, and this makes the encoder complicated.

In order to overcome the above-mentioned problems, it is an object of the present invention to provide an encoder capable of detecting an absolute value of an angle of rotation or a moving distance, etc., of a target to be measured by a simple configuration with high accuracy.

Means for Solving Problem

An encoder according to the present invention is an optical encoder comprising a scale plate, a light source device, and a photodetecting device. The scale plate is provided with a plurality of regions to be detected alternately arranged, along a reference line, on first and second lines which respectively extend so as to sandwich the reference line, and on the respective regions to be detected, one or more light patterns which transmits light and one or more dark patterns which shield light are aligned in an arbitrary order. The light source device irradiates the plurality of regions to be detected with light. The photodetecting device is arranged so as to face the light source device through the scale plate, and has a photodetecting region in which a plurality of pixels are two-dimensionally aligned in a first direction in which the reference line extends and in a second direction perpendicular to the first direction. The photodetecting device outputs light intensity profile data indicating a one-dimensional distribution of incident light intensity along each of the first and second directions.

In particular, in the encoder according to the present invention, the alignment consisting of the light patterns and the dark patterns along the second direction is different among the plurality of regions to be detected. In addition, when the width along the first direction in the photodetecting region is defined as W and the arrangement pitches of the regions to be detected arranged alternately between the first and second lines along the reference line are defined as D, a relational expression of $W/2<D<W$ is satisfied.

In the encoder according to the present invention, at least one of two regions to be detected adjacent to each other between the first line and the second line is always overlapping the photodetecting region of the photodetecting device when it is viewed from the light source device. Here, the alignment of light and dark patterns along the second direction perpendicular to the first direction in which the reference line extends is different among the regions to be detected, so that it becomes possible to identify a region to be detected to overlap the photodetecting region based on light intensity profile data along the second direction. Furthermore, it also becomes possible to identify a position of the identified region to be detected in the first direction based on light intensity profile data along the first direction. By thus using the photodetecting device (in a simple configuration) which outputs light intensity profile data indicating a one-dimensional distribution of incident light intensity along each of the first direction in which the reference line extends and the second line perpendicular to the first direction, it becomes possible to detect an absolute value of an angle of rotation or a moving distance, etc., of a target to be measured with high accuracy. Even when two regions to be detected simultaneously overlap the photodetecting region of the photodetecting device, the two regions to be detected are present on the first line and second line, respectively, so that identification of these two regions to be detected based on light intensity profile data along the second direction is not hindered.

In addition, in the encoder according to the present invention, it is preferable that light and dark patterns along the second direction in each of the regions to be detected are defined by the number of light transmitting holes to be formed in each region to be detected and positions of the light transmitting holes along the second direction. Thus, by adjusting the number of light transmitting holes to be formed in the scale plate and the positions of the light transmitting holes along the second direction, alignments of the light and dark patterns in the respective regions to be detected can be easily and reliably made different.

The encoder according to the present invention can be realized by various embodiments. As one of the embodiments, there is a rotary encoder in which a scale plate rotates and a plurality of regions to be detected are arranged on the scale plate while a direction of the rotation is set as a first direction. As another embodiment, there is a linear encoder in which the scale plate linearly moves and a plurality of regions to be detected are arranged on the scale plate while the linear direction is set as a first direction.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

EFFECT OF THE INVENTION

In accordance with the encoder according to the present invention, an absolute value of an angle of rotation or a moving distance, etc., of a target to be measured can be detected by a simple configuration with high accuracy.

BRIEF DESCRIPTION OF THE DRAWINGS

FIG. 10 is a front view of a scale plate when a linear encoder is constituted as a modified example of the encoder according to the second embodiment shown in FIG. 9.

DESCRIPTION OF THE REFERENCE NUMERALS

1 ... encoder; 3 ... scale plate; 4 ($4_1$, $4_2$ ... $4_{63}$, $4_{64}$) ... region to be detected; 5 ... light transmitting hole; 6 ... light source device; 7 ... profile sensor (photodetecting apparatus); 100 ... photodetecting region; A ... moving direction (first direction); and L1, L2 ... line, R: reference line.

BEST MODES FOR CARRYING OUT THE INVENTION

In the following, embodiments of an encoder according to the present invention will be explained in detail with reference to FIGS. 1 to 10. In the explanation of the drawings, constituents identical to each other will be referred to with numerals identical to each other without repeating their overlapping descriptions.

Figure 1:
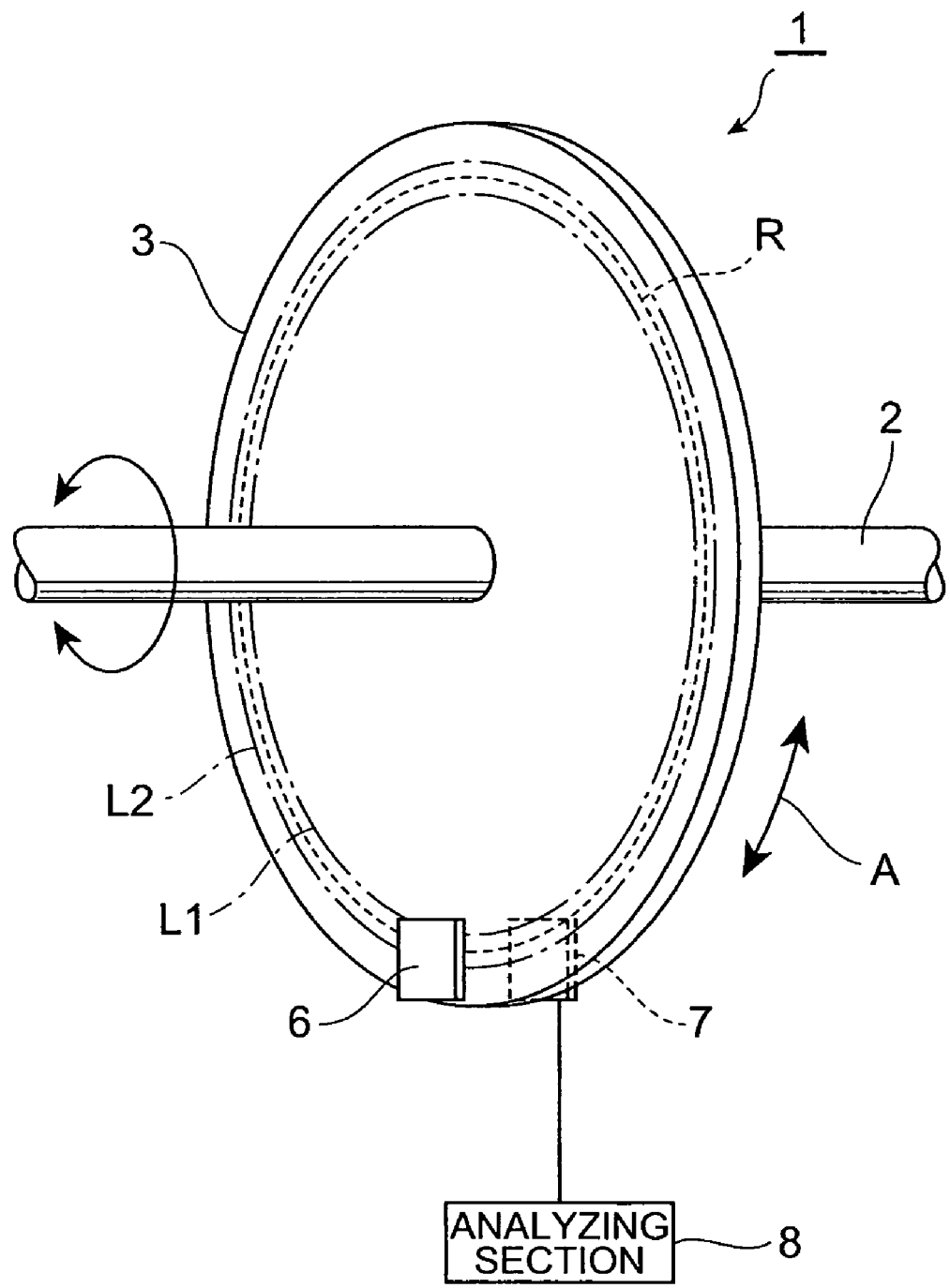
FIG. 1 is a view showing a configuration of a first embodiment of an encoder according to the present invention.

FIG. 1 is a view showing a configuration of a first embodiment of the encoder according to the present invention. The encoder 1 is a so-called absolute-type rotary encoder, and has a rotating shaft 2 to be joined to a target to be measured. To the rotating shaft 2, a disk-shaped scale plate 3 is fixed, and the scale plate 3 rotates with rotation of the rotating shaft 2. The direction of the rotation is defined as a moving direction A of the scale plate 3.

Figure 2:
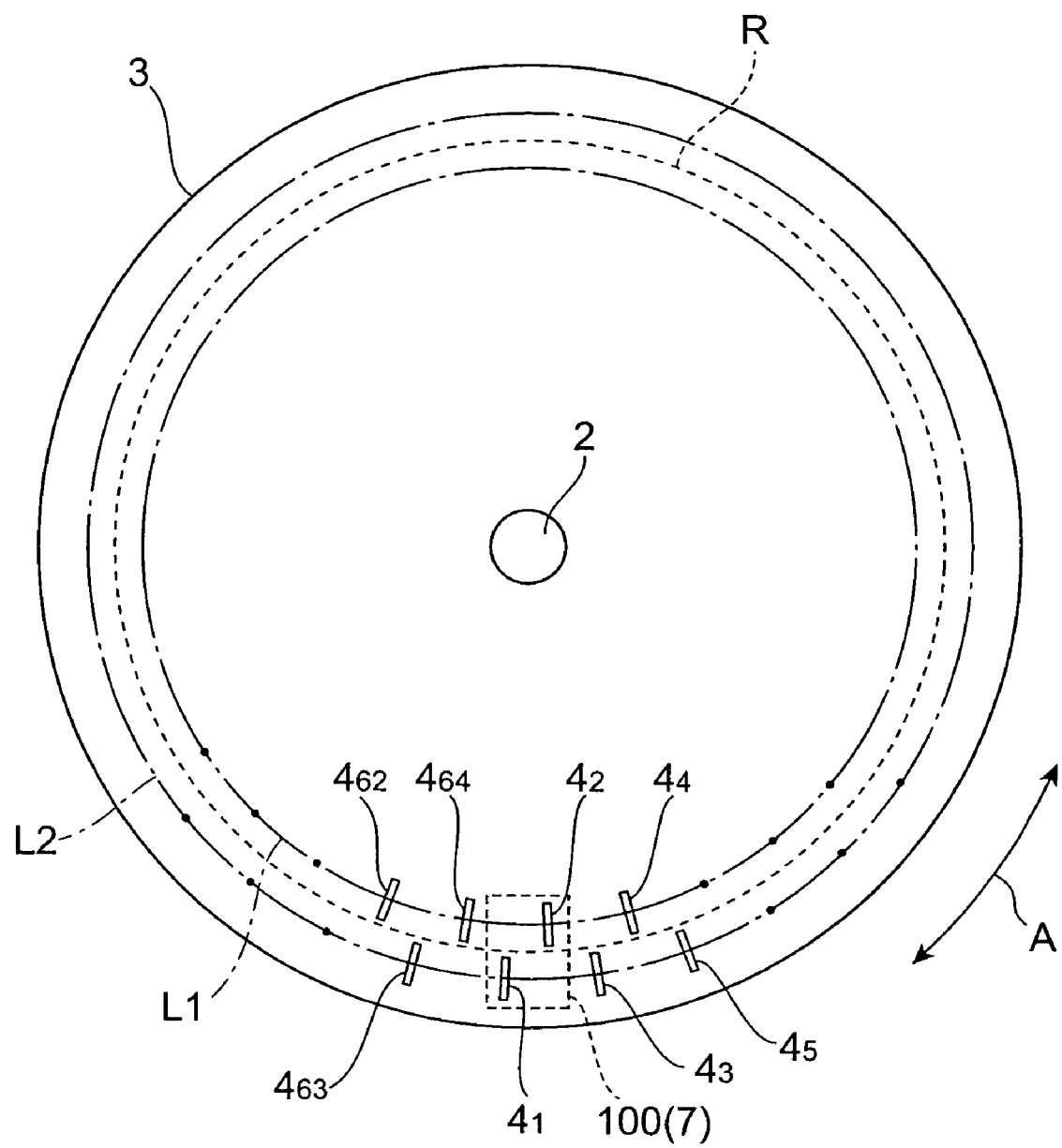
FIG. 2 is a front view of a scale plate in the encoder according to the first embodiment shown in FIG. 1.

FIG. 2 is a front view of the scale plate 3 of the encoder 1. As shown in FIG. 2, on an edge portion of the scale plate 3, a plurality of regions to be detected 4 are alternately arranged on a line L1 and a line L2 extending so as to sandwich a reference line R. Namely, the extending direction of the reference line R and the moving direction A coincide with each other, and along the moving direction A, the line L1 and the line L2 that are concentric with each other are set, and the plurality of regions to be detected 4 are alternately arranged on the line L1 and the line L2 along the moving direction A. In detail, the plural regions to be detected 4 are arranged on the respective line L1 and line L2 at predetermined intervals, and one region to be detected 4 arranged on the line L2 is positioned in a middle region between the regions to be detected 4 adjacent to each other among the regions to be detected 4 arranged on the line L1.

Figure 3:
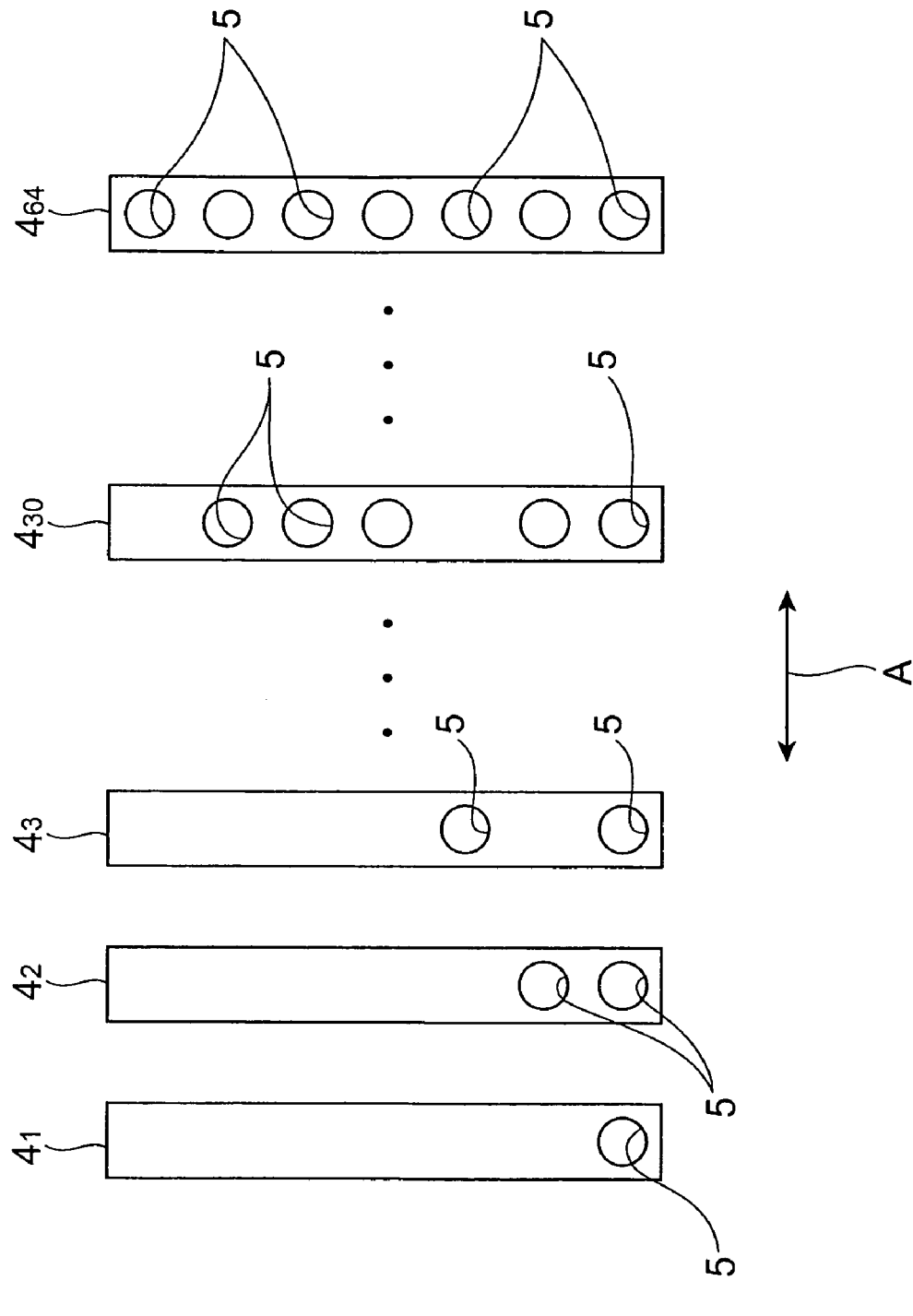
FIG. 3 is a view showing a configuration of regions to be detected in the encoder according to the first embodiment shown in FIG. 1.

As shown in FIG. 3, by differences in the number of light transmitting holes 5 formed in each of the regions to be detected of the scale plate 3 and positions of the light transmitting holes 5 in a direction perpendicular to the moving direction A (that is, a radial direction of the scale plate 3), the regions to be detected 4 are made different from each other in alignment of light and dark patterns along the direction perpendicular to the moving direction A in the respective regions to be detected. In this specification, a light transmitting portion where the light transmitting hole 5 is positioned is defined as a light pattern, and a light shielding portion is defined as a dark pattern. Thus, by making different the numbers of light transmitting holes 5 formed in the respective regions to be detected of the scale plate 3 and the positions of the light transmitting holes 5 in the direction perpendicular to the moving direction A, alignments of light and dark patterns in the respective regions to be detected can be easily and reliably made different from each other.

For example, when 64 regions to be detected $4_1$, $4_2$, $4_3$ ... $4_{30}$ ... $4_{64}$ are arranged on the edge portion of the scale plate 3 at equiangular intervals around the rotating shaft 2, to make the light and dark patterns different among the regions to be detected $4_1$ through $4_{64}$, at least 6-bit information is necessary. Here, 6-bit information is created based on whether to form the light transmitting hole 5 at 6 positions along the direction perpendicular to the moving direction A. To cope with warping and axis deviation of the rotating scale plate 3, on the outer end portions of the regions to be detected $4_1$ through $4_{64}$, a light transmitting hole 5 is always formed. When two or more light transmitting holes 5 are adjacent to each other, these may be connected to each other to form one light transmitting hole.

As shown in FIG. 1, the encoder 1 comprises a light source device 6 including LED, etc., for irradiating the regions to be detected 4 alternately arranged on the lines L1 and L2 with light, and a profile sensor (photodetecting device) 7 disposed so as to face the light source device 6 through the scale plate 3. The profile sensor 7 receives light that has passed through the light transmitting holes 5 of the regions to be detected 4 of light emitted from the light source device 6, and outputs light intensity profile data to an analyzing section 8.

Figure 4:
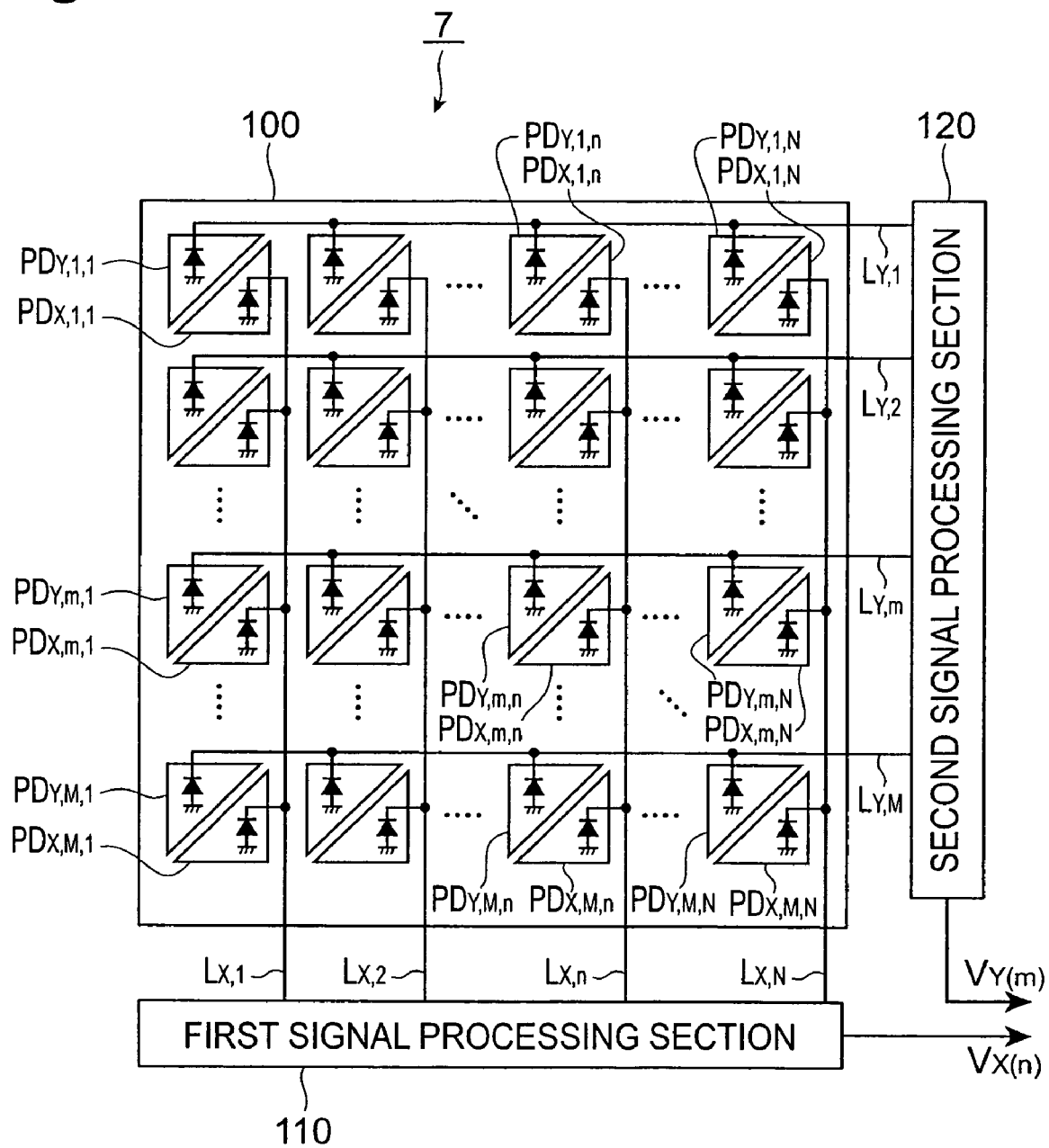
FIG. 4 is a view showing a configuration of a profile sensor (photodetecting device) in the encoder according to the first embodiment shown in FIG. 1.

Here, a configuration of the profile sensor 7 will be explained. FIG. 4 is a view showing a configuration of the profile sensor 7 in the encoder 1. The profile sensor 7 includes a photodetecting region 100, a first signal processing section 110, and a second signal processing section 120. The photodetecting region 100 includes M×N pixels two-dimensionally aligned in the moving direction A (tangential to the lines L1 and L2) and in the direction perpendicular to the moving direction A, and in a pixel at a position in the m-th row and the n-th column, two photodiodes $PD_{X,m,n}$ and $PD_{Y,m,n}$ are formed. M and N are integers of 2 or more, m is an arbitrary integer of 1 or more but M or less, and n is an arbitrary integer of 1 or more but N or less. Anode terminals of the photodiodes $PD_{X,m,n}$ and $PD_{Y,m,n}$ are grounded. Cathode terminals of M photodiodes $PD_{X,1,n}$ through $PD_{X,M,n}$ of the n-th column are connected to the first signal processing section 110 by a common wiring $L_{X,n}$. Cathode terminals of N photodiodes $PD_{Y,m,1}$ and $PD_{Y,m,N}$ of the m-th row are connected to the second signal processing section 120 by a common wiring $L_{Y,m}$.

Figure 5:
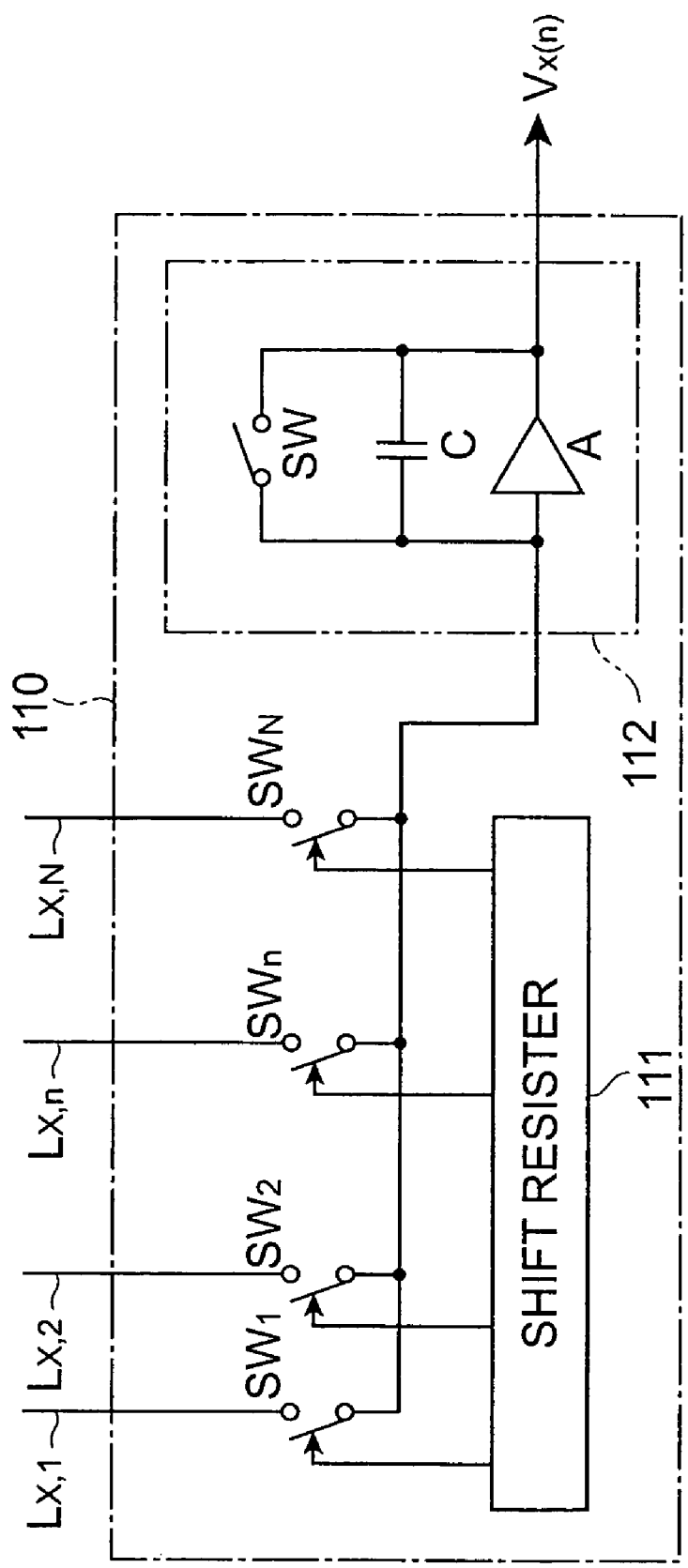
FIG. 5 is a circuit diagram of a first signal processing section included in the profile sensor in the encoder according to the first embodiment shown in FIG. 1.

FIG. 5 is a circuit diagram of the first signal processing section 110 included in the profile sensor 7. The first signal processing section 110 constitutes a shift register 111, an integrating circuit 112, and N switches $SW_1$ through $SW_N$. One ends of the switches $SW_n$ are connected to the wiring $L_{X,n}$, and the other ends of the switches $SW_n$ are connected to an input terminal of the integrating circuit 112 via a common wiring. The switches $SW_n$ close in order based on a control signal outputted from the shift register 111. The integrating circuit 112 includes an amplifier A, a capacitor C, and a switch SW. The capacitor C and the switch SW are connected parallel to each other and are provided between an input terminal and an output terminal of the amplifier A. When the switch SW closes, the capacitor C discharges and the voltage to be outputted from the integrating circuit 112 is initialized. When the switch SW opens and the switches $SW_n$ close, a sum of charges generated according to light incidence on the respective M photodiodes $PD_{X,1,n}$ through $PD_{X,M,n}$ in the n-th column connected to the wiring $L_{X,n}$ is inputted into the integrating circuit 112 and the charges are accumulated in the capacitor C. Then, a voltage $V_{X(n)}$ corresponding to the accumulated charge amount is outputted from the integrating circuit 112. The second signal processing section 120 also has the same configuration as that of the first signal processing section 110 and operates in the same manner.

The profile sensor 7 constituted as described above can output first light intensity profile data $V_{X(n)}$ that indicates a one-dimensional distribution of incident light intensity in the moving direction A (tangential to the lines L1 and L2) in the photodetecting region 100 from the first signal processing section 110, and can output second light intensity profile data $V_{Y(m)}$ that indicates a one-dimensional distribution of incident light intensity along the direction perpendicular to the moving direction A from the second signal processing section 120. The analyzing section 8 inputs and analyzes these first light intensity profile data $V_{X(n)}$ and second light intensity profile data $V_{Y(m)}$.

Figure 6:
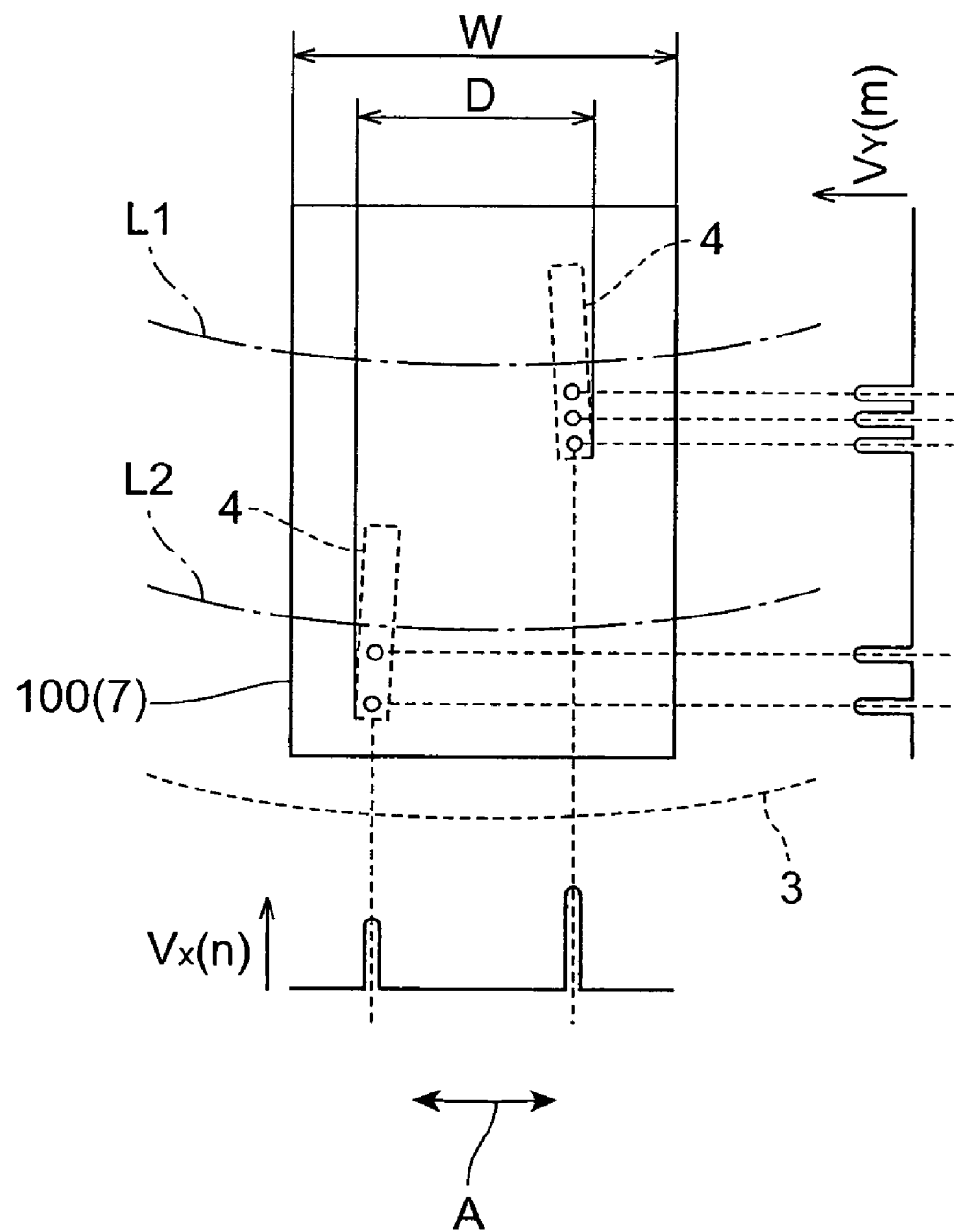
FIG. 6 is a view showing a first relationship between a photodetecting region of the profile sensor and a region to be detected of a scale plate in the encoder according to the first embodiment shown in FIG. 1.

Next, the relationship between the photodetecting region 100 of the profile sensor 7 and the regions to be detected 4 alternately arranged on the line L1 and the line L2 will be explained. As shown in FIG. 6, the photodetecting region 100 and the regions to be detected 4 satisfy the relational expression of W/2<D<W when the width along the moving direction A of the photodetecting region 100 is defined as W and the arrangement pitches of the regions to be detected 4 alternately arranged on the line L1 and the line L2 are defined as D. In this specification, the arrangement pitches D are regulated according to the longest distance along the moving direction A between adjacent regions to be detected 4 as shown in FIG. 6.

Figure 7:
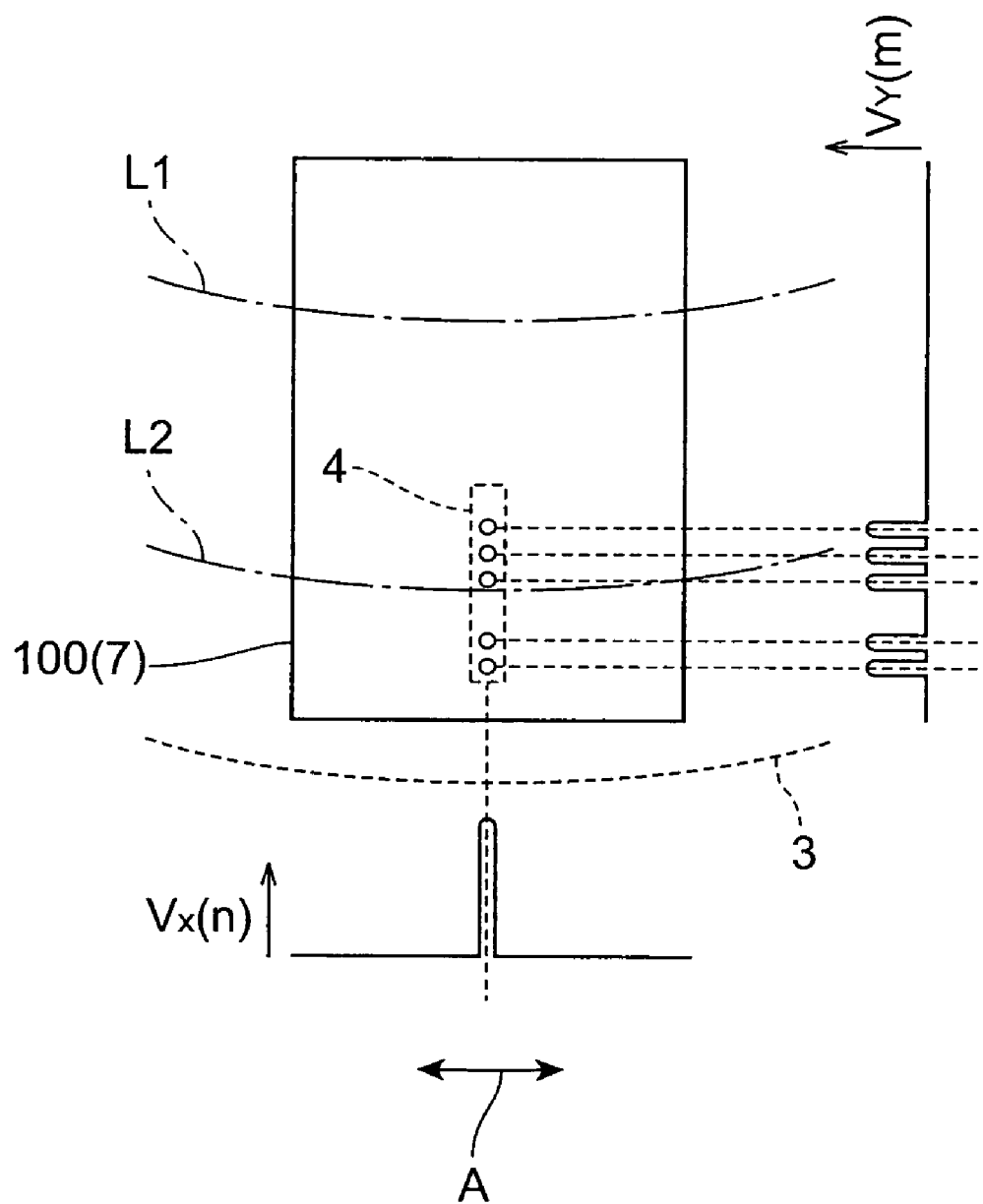
FIG. 7 is a view showing a second relationship between the photodetecting sensor of the profile sensor and the region to be detected of the scale plate in the encoder according to the first embodiment shown in FIG. 1.

Thereby, in the encoder 1, as shown in FIG. 6 and FIG. 7, at least one of two regions to be detected adjacent to each other (two regions to be detected the distance between which is shortest) between the line L1 and the line L2 is always overlapping the photodetecting region 100 of the profile sensor 7. Here, the alignment of light and dark patterns along the direction perpendicular to the moving direction A is different among the regions to be detected 4, so that based on the second light intensity profile data $V_{Y(m)}$ along the direction perpendicular to the moving direction A, the region to be detected 4 at a position that overlaps the photodetecting region 100 can be identified by the analyzing section 8. Furthermore, based on the first light intensity profile data $V_{X(n)}$ along the moving direction A, the position of the identified region to be detected 4 in the moving direction A can be identified by the analyzing section 8.

By thus applying the profile sensor 7 structured as described above to the encoder 1, the frame memory, etc., that become necessary when a two-dimensional image sensor is applied, becomes unnecessary, and an absolute value of an angle of rotation of a target to be measured can be detected by a simple configuration with high accuracy. In addition, the application of the profile sensor 7 remarkably shortens the processing time more than in the case where a two-dimensional image sensor is applied when the number of pixels is the same.

As shown in FIG. 6, even when two regions to be detected 4 are positioned on the photodetecting region 100 of the profile sensor 7 at the same time, these two regions to be detected 4 are on the line L1 and the line L2, respectively, so that the identification of these two regions to be detected 4 based on the second light intensity profile data $V_{Y(m)}$ along the direction perpendicular to the moving direction A is not hindered.

Figure 8:
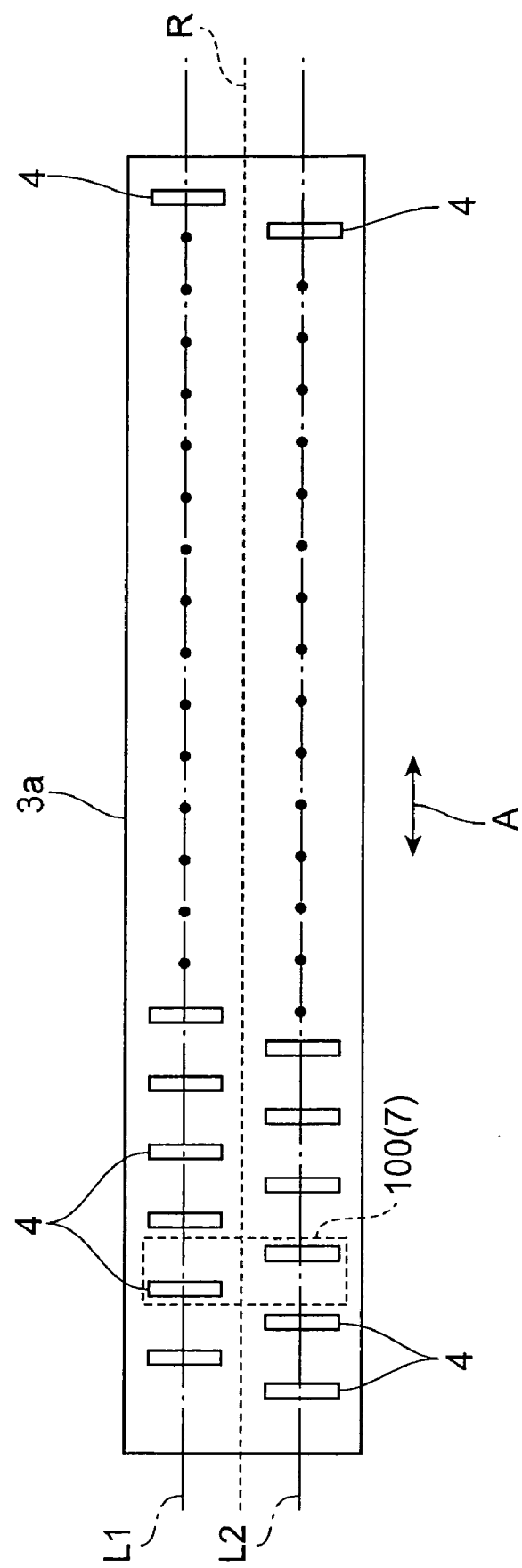
FIG. 8 is a front view of a scale plate when a linear encoder is constituted as a modified example of the encoder according to the first embodiment shown in FIG. 1.

The present invention is not limited to the above-described first embodiment. For example, the encoder 1 according to the first embodiment is constituted as a rotary encoder in which the scale plate 3 rotates and a plurality of regions to be detected 4 are arranged on the scale plate 3 while the direction of rotation is set as the moving direction A. However, as shown in FIG. 8, it is also possible to constitute a linear encoder in which a long scale plate 3a moves linearly in its longitudinal direction and a plurality of regions to be detected 4 are arranged on the scale plate 3a while the linear direction is set as a moving direction A. FIG. 8 is a front view of a scale plate in a modified example of the encoder according to the first embodiment shown in FIG. 1, and an encoder according to the modified example is obtained by replacing the scale plate 3 of the encoder 1 shown in FIG. 1 with the scale plate 3a shown in FIG. 8.

Even when a linear encoder is thus constituted by using the scale plate 3a of FIG. 8, when the photodetecting region 100 of the profile sensor 7 and the regions to be detected 4 satisfy the relational expression W/2<D<W provided that the width along the moving direction A of the photodetecting region 100 is defined as W and the arrangement pitches of the regions to be detected 4 alternately arranged on the line L1 and the line L2 are defined as D, it becomes possible to detect an absolute value of a moving distance of a target to be measured by a simple configuration with high accuracy for the reason described above.

Figure 9:
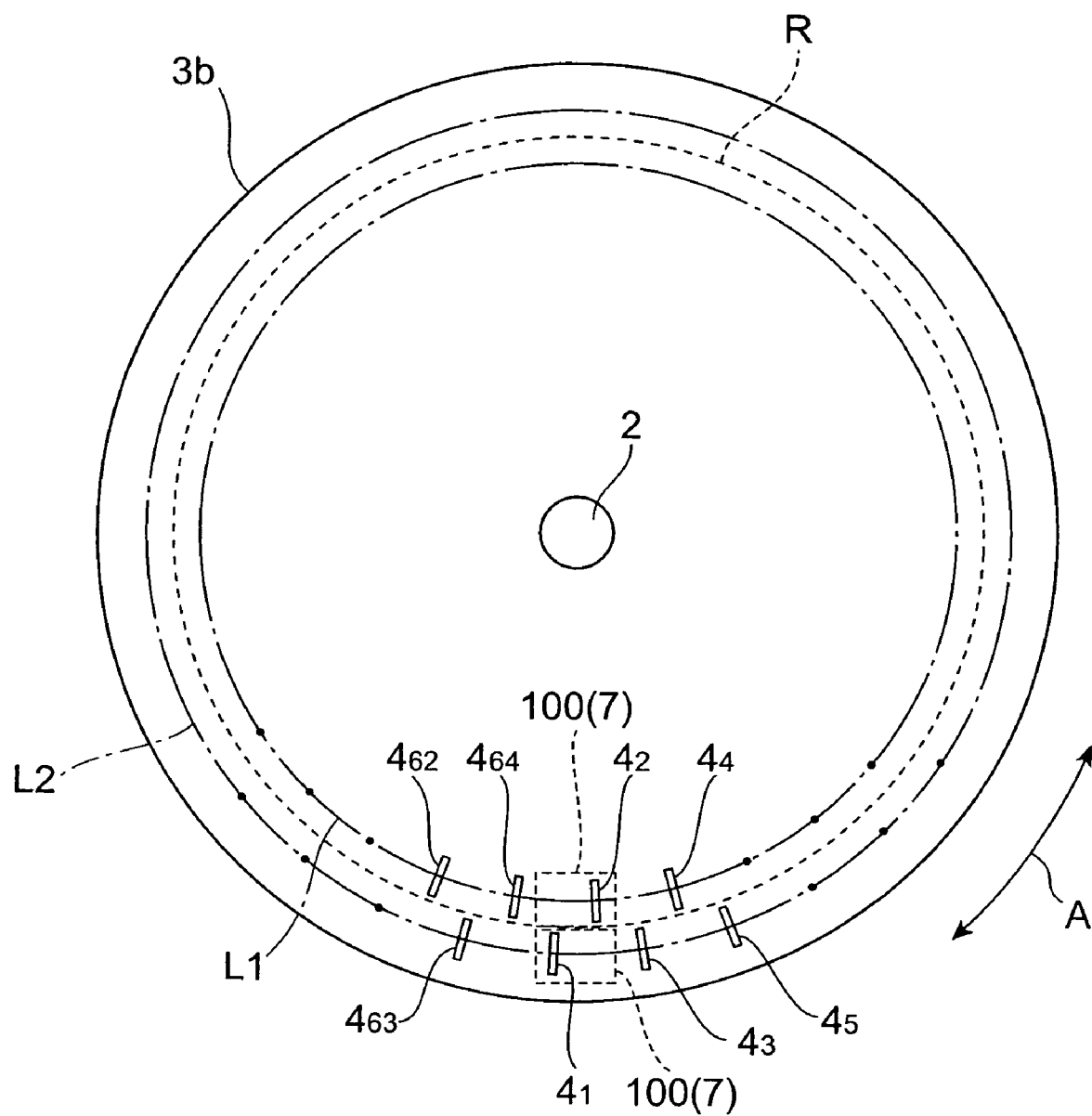
FIG. 9 is a front view of a scale plate in a second embodiment of the encoder according to the present invention.

FIG. 9 is a front view of a scale plate in a second embodiment of the encoder according to the present invention. The encoder according to the second embodiment is also obtained by replacing the scale plate 3 of the encoder 1 shown in FIG. 1 with the scale plate 3b shown in FIG. 9. In the encoder according to the second embodiment, as shown in FIG. 9, a pair of profile sensors 7 are arranged along a direction perpendicular to the moving direction A (that is, a radial direction of the scale plate 3). By constituting the encoder so that the regions to be detected 4 on the line L1 are positioned on the photodetecting region 100 of one of the profile sensors 7 and the regions to be detected 4 on the line L2 are positioned on the photodetecting region 100 of the other profile sensor 7, the encoder according to the second embodiment is obtained. Then, even in the case where the configuration is employed, as shown in FIG. 10, the encoder according to the present invention can be constituted as a linear encoder. Namely, FIG. 10 is a front view of a scale plate in a modified example of the encoder according to the second embodiment shown in FIG. 9, and the encoder according to the present invention is also obtained even when the scale plate 3c shown in FIG. 10 is replaced with the scale plate 3 of the encoder 1 shown in FIG. 1.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The encoder according to the present invention is applicable to positional measurements of a machine tool such as a lathe or a milling machine or semiconductor manufacturing equipment.

The invention claimed is:

1. An encoder comprising:
    a scale plate provided with a plurality of regions to be detected alternately arranged, along a reference line, on first and second lines which respectively extend so as to sandwich the reference line, each of the regions to be detected in which one or more light patterns to transmit light and one or more dark patterns to shield light are aligned in an arbitrary order;
    a light source device irradiating the plurality of regions to be detected with light; and
    a photodetecting device, arranged so as to face said light source device through said scale plate, having a photodetecting region that includes a plurality of pixels two-dimensionally aligned in a first direction in which the reference line extends and in a second direction perpendicular to the first direction, said photodetecting device having a first signal processing section outputting light intensity profile data indicating a one-dimensional distribution of incident light intensity along the first direction, and a second signal processing section outputting light intensity profile data indicating a one-dimensional distribution of incident light intensity along the second direction,
    wherein the alignment of the light patterns and dark patterns along the second direction is different among the regions to be detected, and
    wherein, when a width along the first direction of the photodetecting region is defined as W and arrangement pitches of the regions to be detected alternately arranged between the first and second lines along the reference line are defined as D, a relational expression of W/2<D<W is satisfied.

2. An encoder according to claim 1, wherein the light and dark patterns along the second direction in each of the regions to be detected are defined by the number of light transmitting holes to be formed in each region to be detected and the positions of the light transmitting holes along the second direction.

3. An encoder according to claim 1, wherein said scale plate rotates, and on said scale plate, the plurality of regions to be detected are arranged alternately on the first and second lines while the direction of rotation is set as the first direction.

4. An encoder according to claim 1, wherein said scale plate moves linearly, and on the scale plate, the plurality of regions to be detected are alternately arranged on the first and second lines while the linear direction is set as the first direction.

5. An encoder according to claim 1, wherein said plurality of pixels included in said photodetecting region is constituted by a first pixel group electrically connecting said first signal processing section and a second pixel group electrically connecting said second signal processing section.

* * * * *